(12) United States Patent
Fung et al.

(10) Patent No.: US 9,433,319 B2
(45) Date of Patent: Sep. 6, 2016

(54) SPLASH GUARD FOR A COOKING APPLIANCE

(71) Applicant: CONAIR CORPORATION, Stamford, CT (US)

(72) Inventors: Kam Fai Fung, Hong Kong (CN); Kin Man Lai, Hong Kong (CN)

(73) Assignee: CONAIR CORPORATION, Stamford, CT (US)

( * ) Notice: Subject to any disclaimer, the term of this patent is extended or adjusted under 35 U.S.C. 154(b) by 214 days.

(21) Appl. No.: 13/958,718

(22) Filed: Aug. 5, 2013

(65) Prior Publication Data

US 2015/0033956 A1    Feb. 5, 2015

(51) Int. Cl.
*A47J 37/06*  (2006.01)
*A47J 36/36*  (2006.01)
*F24C 15/12*  (2006.01)

(52) U.S. Cl.
CPC ............. *A47J 36/36* (2013.01); *A47J 37/0611* (2013.01); *F24C 15/12* (2013.01); *A47J 2037/0617* (2013.01)

(58) Field of Classification Search
CPC .... A47J 37/101; A47J 36/06; A47J 37/0611; A47J 2037/0617; F24C 15/12
USPC ....... 99/645, 372, 376, 377, 379; 126/299 C, 126/383.1; 220/369, 731
See application file for complete search history.

(56) References Cited

U.S. PATENT DOCUMENTS

| | | |
|---|---|---|
| 2,033,060 A | 3/1936 | Anderson |
| 2,057,501 A | 10/1936 | Parr |
| 2,607,287 A | 8/1952 | Price |
| 2,719,903 A | 10/1955 | Oertli |
| 3,319,620 A * | 5/1967 | Nazzaro ........................ 126/211 |
| 4,036,995 A | 7/1977 | Koether et al. |
| 4,088,067 A | 5/1978 | Kaebitzsch et al. |
| 4,206,345 A | 6/1980 | Maass et al. |
| 4,237,856 A * | 12/1980 | Trombatore ............. 126/299 C |
| 4,697,504 A | 10/1987 | Keating |
| 5,237,914 A | 8/1993 | Carstensen |
| 5,467,696 A | 11/1995 | Everhart |
| 5,531,155 A | 7/1996 | Pellicane et al. |
| 5,712,466 A | 1/1998 | Spicer |
| 5,758,568 A | 6/1998 | Moravec |
| 5,848,567 A | 12/1998 | Chiang |
| 5,992,302 A | 11/1999 | Geisler |
| 6,062,130 A | 5/2000 | Brady |
| D436,498 S | 1/2001 | Carlson et al. |
| 6,389,959 B1 | 5/2002 | Robertson |
| 6,439,108 B1 | 8/2002 | Wu |
| RE37,988 E | 2/2003 | Uss |
| 6,539,842 B1 | 4/2003 | Chapman et al. |
| 6,591,740 B1 | 7/2003 | Hsu |
| 6,595,116 B1 | 7/2003 | Lin |
| 6,705,306 B1 | 3/2004 | Dickey |
| 7,514,655 B2 | 4/2009 | Fernandez et al. |
| 7,608,803 B2 | 10/2009 | Jerovsek |

(Continued)

*Primary Examiner* — Reginald L Alexander

(74) *Attorney, Agent, or Firm* — Grogan, Tuccillo & Vanderleeden, LLP

(57) ABSTRACT

A cooking appliance includes an upper housing having a first heating surface, a lower housing operatively connected to the upper housing, the lower housing having a second heating surface, and a splash guard having a plurality of peripheral sidewalls. The splash guard is nestable within the lower housing and extendable therefrom to a position wherein the splash guard substantially surrounds the second heating surface.

18 Claims, 10 Drawing Sheets

(56) References Cited

U.S. PATENT DOCUMENTS

| | | |
|---|---|---|
| 7,717,028 B2 | 5/2010 | Serra |
| 8,122,816 B2 | 2/2012 | Yu |
| 8,261,657 B2 | 9/2012 | Serra et al. |
| 8,336,451 B2 * | 12/2012 | Kuo ................................ 99/376 |
| 2004/0074398 A1 | 4/2004 | Griffin et al. |
| 2004/0173201 A1 * | 9/2004 | Haemerle ................. 126/299 C |
| 2005/0139086 A1 | 6/2005 | McHutchison |
| 2009/0165774 A1 | 7/2009 | Johnston et al. |
| 2009/0214736 A1 * | 8/2009 | Calzada et al. ................ 426/510 |
| 2010/0300305 A1 * | 12/2010 | Schon ..................... F24C 15/10 99/375 |
| 2012/0137897 A1 | 6/2012 | Tahincioglu |
| 2015/0208862 A1 * | 7/2015 | Garman et al. ................. 99/372 |

* cited by examiner

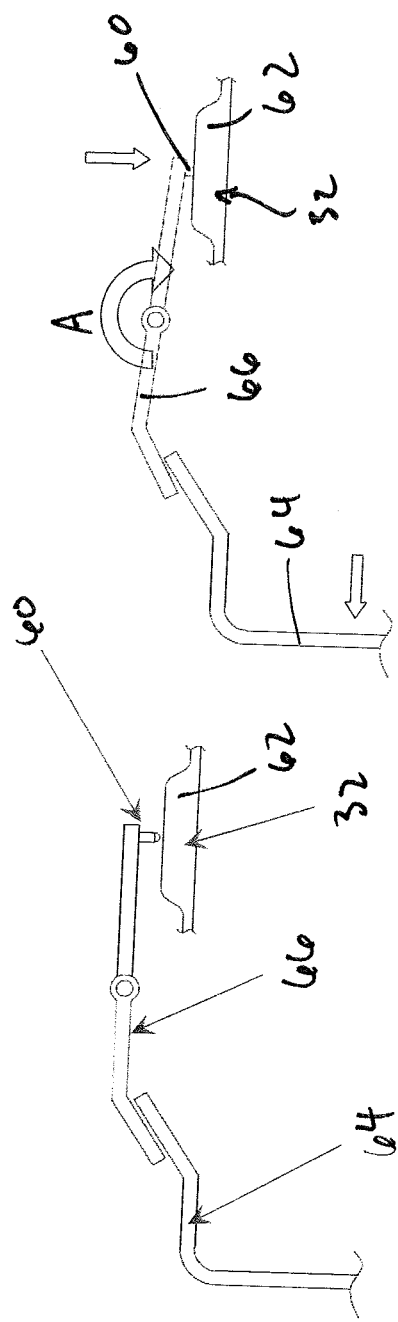

SPLASH GUARD FOR A COOKING APPLIANCE

FIELD OF THE INVENTION

The present invention relates to cooking appliances and, more particularly, to a splash guard for a cooking appliance.

BACKGROUND OF THE INVENTION

Cooking appliances, and in particular electric cooking/grilling devices such as griddles, are known. One type of known grilling devices typically evidences a lower housing having a lower cooking surface and an upper housing having an upper cooking surface, wherein the cooking surfaces are typically heated by an electrical resistance heater. A handle attached to the upper housing allows a user to raise and lower the upper housing relative to the lower housing to accommodate a food item therebetween to be heated.

While existing grilling devices are generally suitable for what is regarded as ordinary performance, there is room for improvement in terms of convenience and cleanliness. As will be readily appreciated, splatter is relatively common when cooking food items at high temperature, particularly food items that contain a degree of water, oil or other fluids. With existing grilling devices, this splatter can create objectionable messes on the surfaces surrounding the device. Accordingly, there is a need for a cooking appliance that is capable of containing splatter during cooking.

SUMMARY OF THE INVENTION

It is an object of the present invention to provide a cooking appliance having a splash guard.

It is another object of the present invention to provide a cooking appliance having a splash guard that contains splatter generated during cooking.

These and other objects are achieved by the present invention.

According to an embodiment of the present invention a cooking appliance includes an upper housing having a first heating surface, a lower housing operatively connected to the upper housing, the lower housing having a second heating surface, and a splash guard having a plurality of peripheral sidewalls. The splash guard is nestable within the lower housing and extendable therefrom to a position wherein the splash guard substantially surrounds the second heating surface.

According to another embodiment of the present invention a splash guard for a cooking appliance having an upper housing having an upper heating surface operatively connected to a lower housing having a lower heating surface is provided. The splash guard includes a plurality of peripheral sidewalls forming a cavity therebetween. The splash guard is received by the lower housing and substantially surrounds the lower heating surface.

According to yet another embodiment of the present invention, a method of containing splatter in a cooking appliance having a lower housing having a first heating surface, and an upper housing operatively connected to the lower housing and having a second heating surface, is provided. The method includes the steps of operatively connecting the upper housing with the lower housing such that the first heating surface is positioned in opposition to the second heating surface, and equipping the cooking appliance with a splash guard. The splash guard has a plurality of peripheral sidewalls forming a cavity therebetween and is received by the lower housing such that the splash guard substantially surrounds the lower heating surface.

BRIEF DESCRIPTION OF THE DRAWINGS

The present invention will be better understood from reading the following description of non-limiting embodiments, with reference to the attached drawings, wherein below:

FIGS. 21 and 22 are schematic illustrations of a mechanism for retraction and extension of the splash guard.

DETAILED DESCRIPTION OF THE PREFERRED EMBODIMENTS

Figure 1:
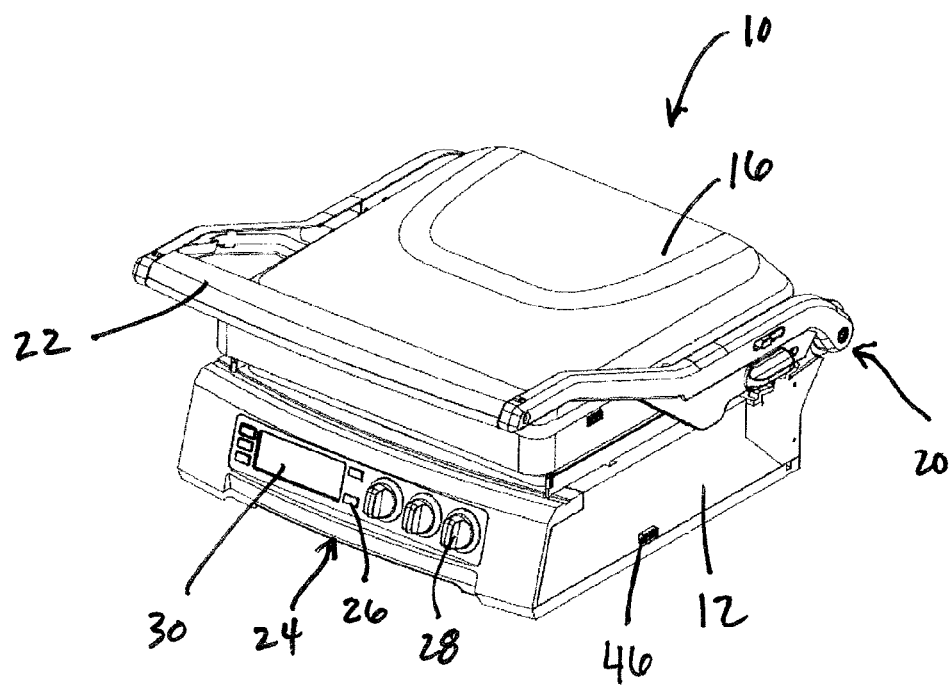
FIG. 1 is a perspective front view of a cooking appliance according to an embodiment of the present invention.
Figure 2:
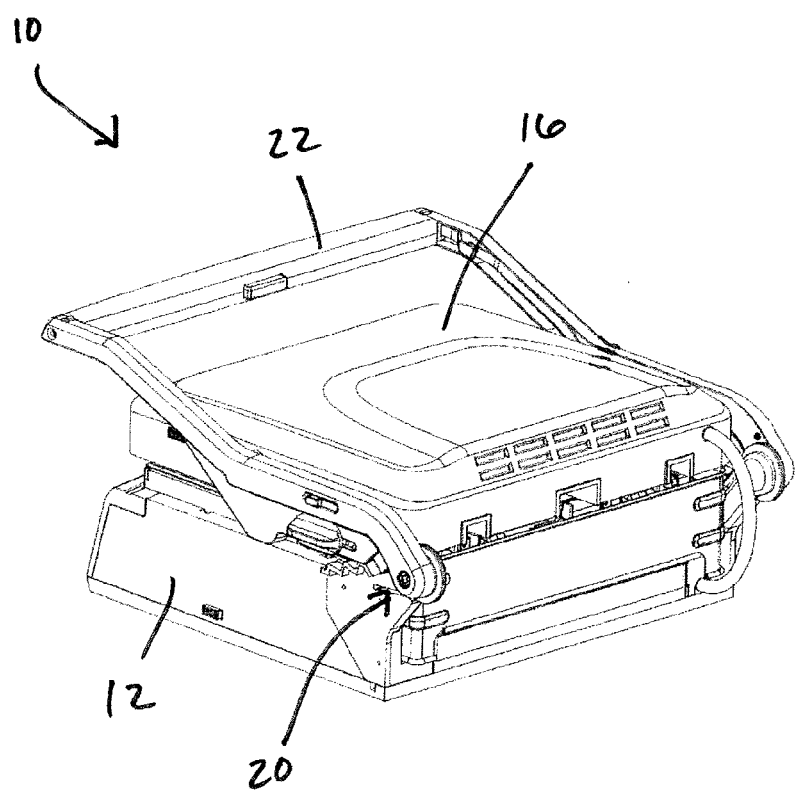
FIG. 2 is a perspective rear view of the cooking appliance of FIG. 1.

Referring to FIGS. 1 and 2, a cooking appliance 10 according to an embodiment of the present invention is shown. As shown therein, the cooking appliance 10 generally takes the form of a countertop grill and includes a lower housing 12 having a lower heating/cooking plate 14 and an upper housing 16 having an upper heating/cooking plate 18.

As best shown in FIG. 2, the upper housing 16 is operatively connected to the lower housing 12 at a rear hinge 20. A handle 22 is attached to the upper housing 16 and allows a user to raise and lower the upper housing 16, via rotation about the hinge 20, in order to selectively position the upper housing 16 in various positions in relation to the lower housing 12.

With further reference to FIGS. 1 and 2, the cooking appliance 10 includes a control panel 24 having an array of buttons 26 and rotatable knobs 28 that allow a user to select and set a variety of cooking and heating parameters, and an LCD screen 30 that allows a user to view the parameters being set, as well as to monitor the cooking process.

Figure 3:
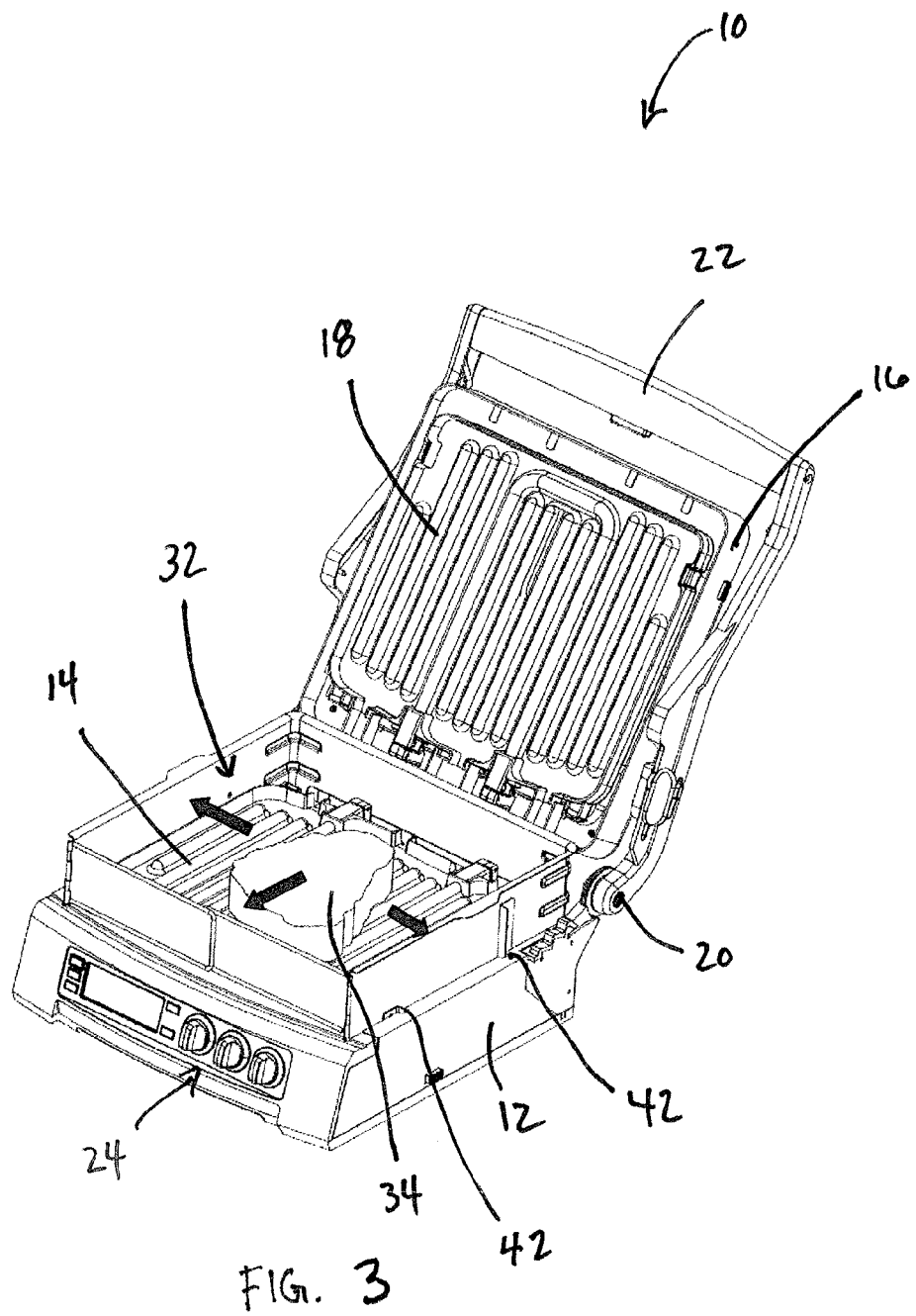
FIG. 3 is a perspective view of the cooking appliance of FIG. 1, illustrating use with a slash guard according to an embodiment of the present invention.

Turning now to FIG. 3, the cooking appliance 10 also includes a removable splash guard 32 that is selectively positionable on, and attachable to, the lower housing 12. As shown therein, the splash guard 32 is substantially rectangular in shape and has sidewalls that closely surround the lower heating plate 14 and food items, such as food item 34, positioned thereon. In the preferred embodiment, the sidewalls are approximately 2 inches in height. In other embodiments, the sidewalls may be more or less than 2 inches in height.

As will be readily appreciated, the splash guard 32 blocks splatter from food items 34 during cooking from exiting the appliance 10, and contains such splatter to the interior of the appliance 10. Accordingly, the splattering of oil and other liquids on a countertop or other surfaces is substantially reduced or eliminated. Importantly, the splash guard 32 is easily removable from the cooking appliance 10 by hand so as to allow for cleaning. In the preferred embodiment, the splash guard 32 is formed from metal and has a non-stick coating to facilitate cleaning.

Figure 4:
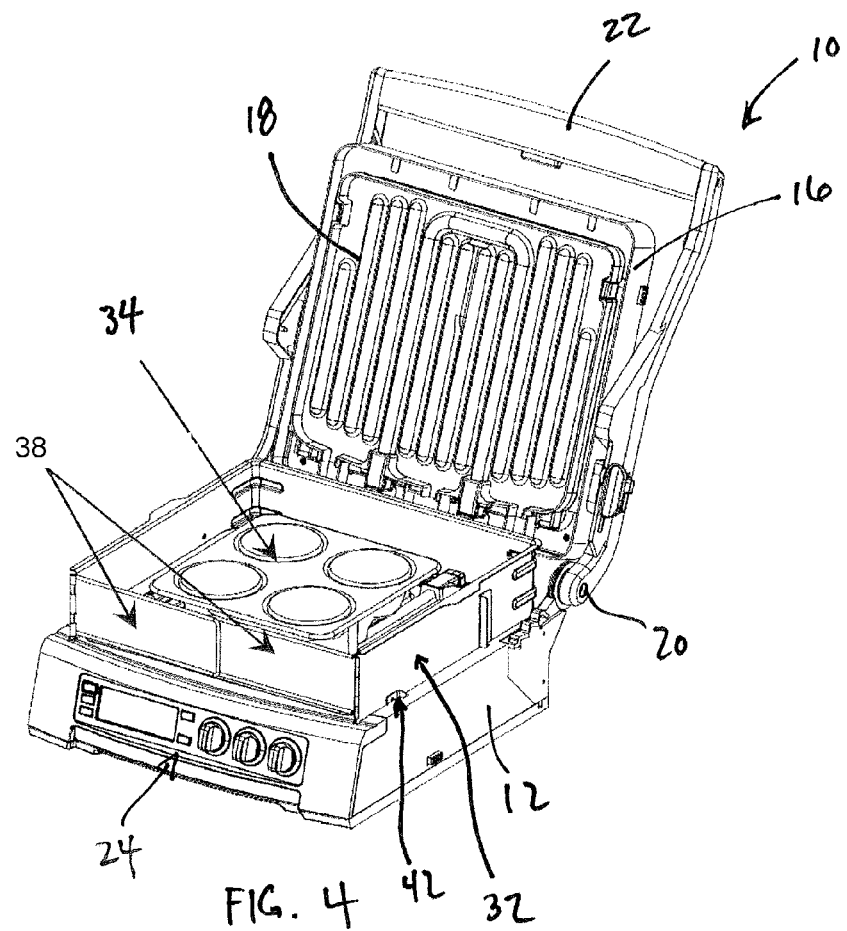
FIG. 4 is another perspective view of the cooking appliance and splash guard of FIG. 3, illustrating the cooking appliance in an open position.
Figure 5:
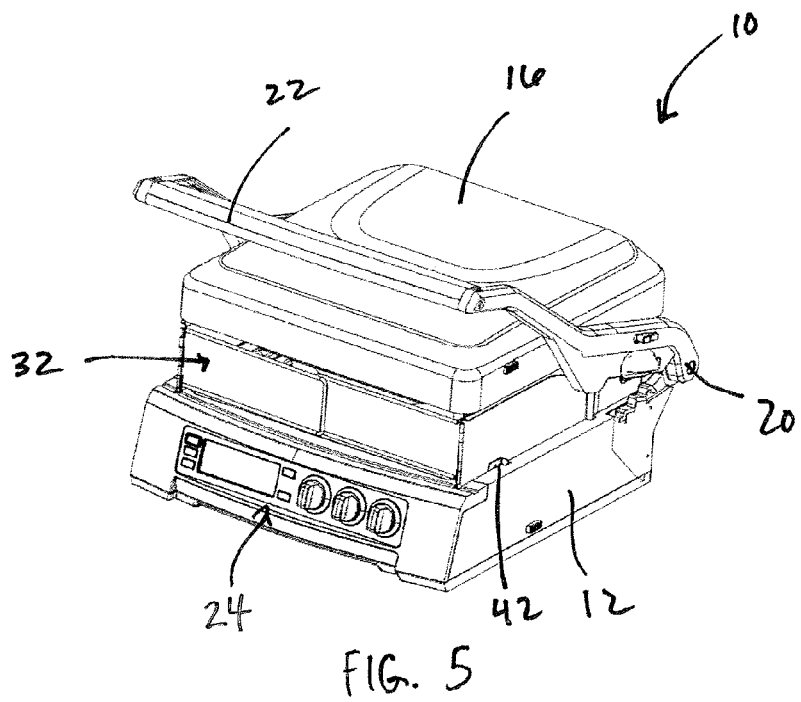
FIG. 5 is a perspective view of the cooking appliance and splash guard of FIG. 3, illustration the cooking appliance in a closed position.

With reference to FIGS. 4 and 5, the cooking appliance 10 can also function as an oven, in a baking mode, when utilized in combination with the splash guard 32. As shown therein, the splash guard 32 is positionable on the lower housing 12 and a baking tray 34 may be positioned on the lower heating plate 14. As shown in FIG. 5, the upper housing 16 may be lowered such that the upper heating plate 18 contacts the upper edges of the sidewalls of the splash guard 32, thereby forming a substantially enclosed baking cavity. In this mode, the cooking appliance 10 is capable of functioning like an oven, to bake pizza, cakes and the like.

Figure 6:
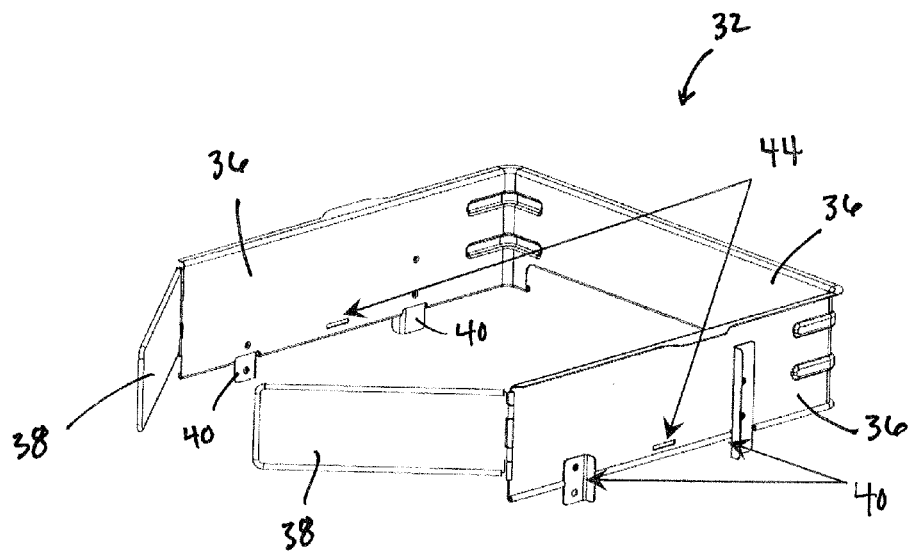
FIG. 6 is a perspective view of the splash guard shown in FIG. 3.

Turning now to FIG. 6, the splash guard 32 is shown in detail. The splash guard 32 has upstanding sidewalls 36 and two foldable doors 38 hingedly coupled to the sidewalls 36. As further shown therein, the splash guard 32 has a pair of slide guides 40 on opposing sides of the splash guard 32 that are received in corresponding slots 42 in the lower housing 12. Opposing sides of splash guard 32 have slots 44 that are utilized to retain the splash guard 32 in a retracted or extended position with respect to the lower housing 12. In particular, the lower housing 12 includes protrusions (not shown) that are configured to engage the slots 44 to retain the splash guard 32 in an extended position.

Figures 7, 8, 9:
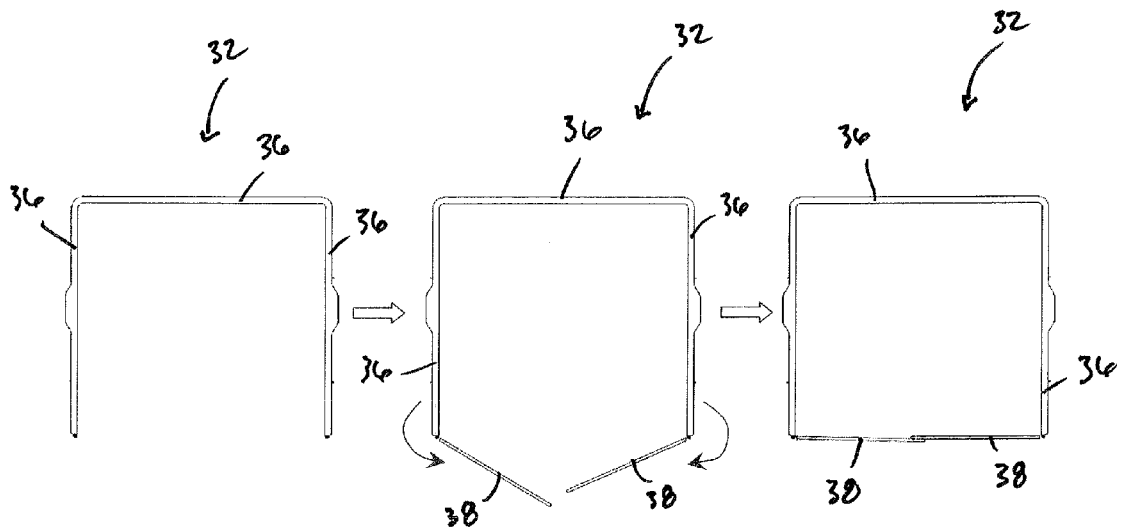
FIG. 7 is top plan view of the splash guard of FIG. 3, illustrating doors thereof in a fully open position.
FIG. 8 is top plan view of the splash guard of FIG. 3, illustrating the closing of the doors thereof.
FIG. 9 is top plan view of the splash guard of FIG. 3, illustrating the doors thereof in a closed position.

As shown in FIGS. 7-9, the doors 38 of the splash guard 32 are rotatable about a hinge such that they may be fully opened, as shown in FIG. 7 (whereby they are folded against the sidewalls 38). The doors may also be rotated closed about their hinges, as shown in FIG. 8, to the position shown in FIG. 9, where they substantially close off the front of the splash guard 32 and encircle the lower heating plate 14. Importantly, when utilized in the baking mode, the doors 38 on the front of the splatter guard 32 provide access to the baking cavity (so that a user can remove or insert items to be baked or to check doneness) without having to open the baking cavity from above (and otherwise creating an instant drop in temperature within the baking cavity).

Figure 10:
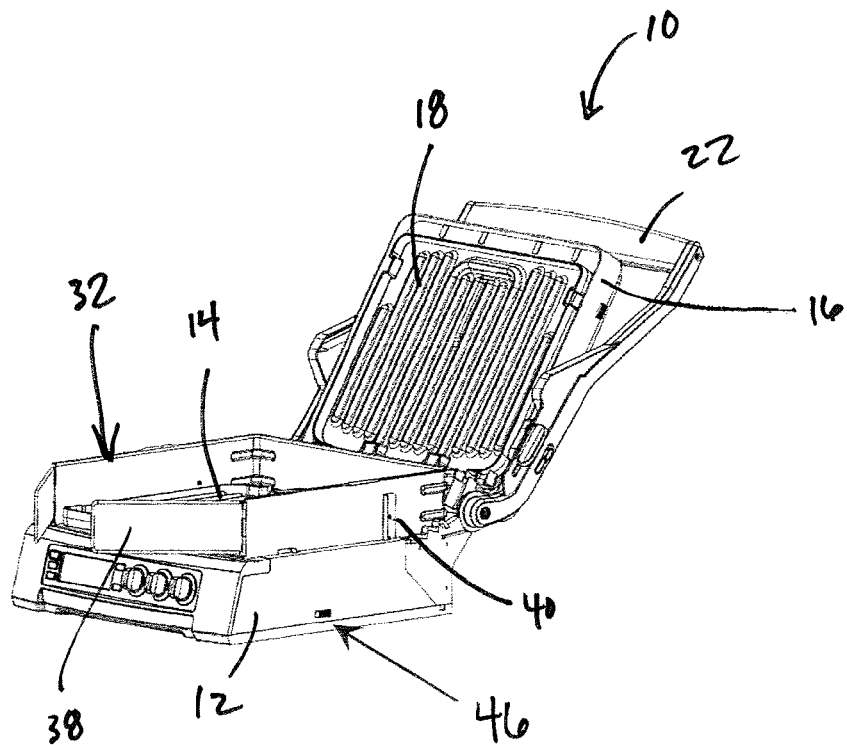
FIG. 10 is a perspective view of the cooking appliance and splash guard of FIG. 3, illustrating the doors of the splash guard in a partially open position.
Figure 11:
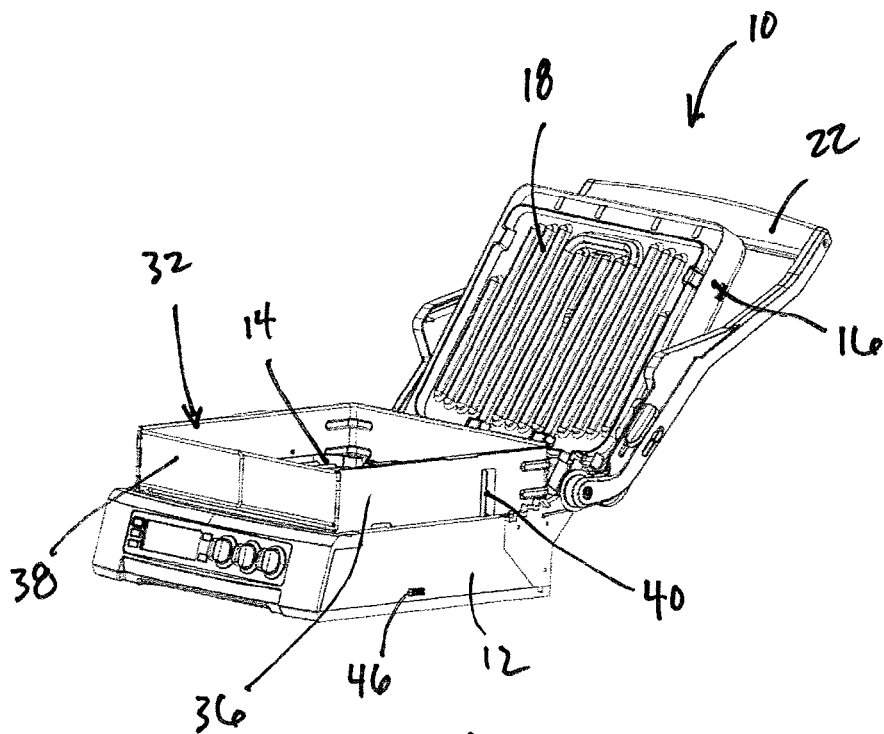
FIG. 11 is a perspective view of the cooking appliance and splash guard of FIG. 3, illustrating the doors of the splash guard in a closed position.

With reference to FIGS. 10 and 11, the cooking appliance includes a release button 46 on the lower housing 12 that allows a user to release the splash guard 32 from engagement with the lower housing 12 so that a user can remove the splash guard 32 for cleaning. In particular, actuating the release button 46 releases engagement of the lower housing 12 with the slots 44, thereby enabling a user to remove the splash guard 32 from the cooking appliance 10.

Figure 13:
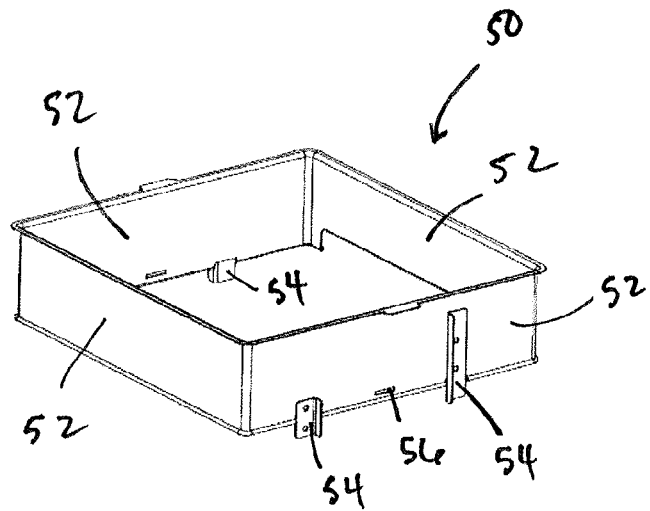
FIG. 13 is a perspective view of the splash guard of FIG. 12.
Figure 12:
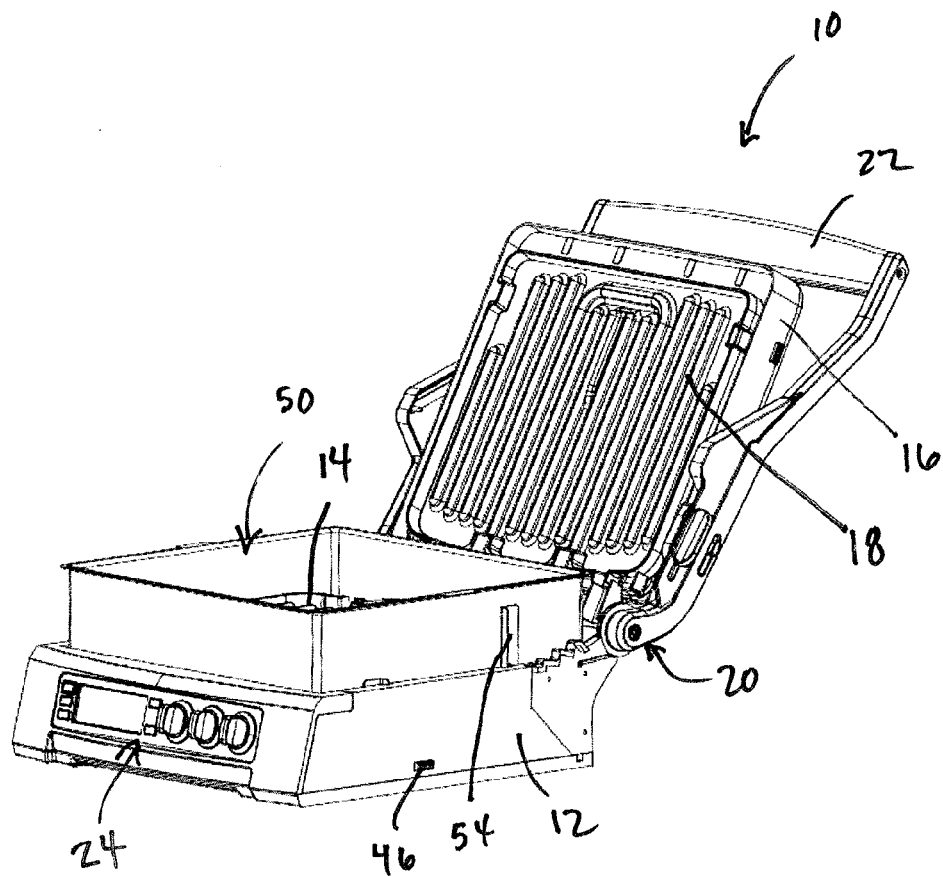
FIG. 12 is a perspective view of a cooking appliance having a splash guard according to another embodiment of the present invention.

Turning to FIGS. 12 and 13, an alternative splash guard 50 is shown. The splash guard 50 is substantially similar to the splash guard 32 disclosed above. In particular, the splash guard 50 is substantially rectangular in shape and has upstanding sidewalls 52. In contrast to the splash guard 32, however, splash guard 50 has four sidewalls 52 and is devoid of any doors. The splash guard 50 has a pair of slide guides 54 on opposing sides of the splash guard 50 that are received in corresponding slots 42 in the lower housing 12 in the same manner as discussed above. In addition, opposing sides of splash guard 50 have slots 56 that are utilized to retain the splash guard 50 in a retracted or extended position with respect to the lower housing 12, in the same manner as discussed above.

Figure 14:
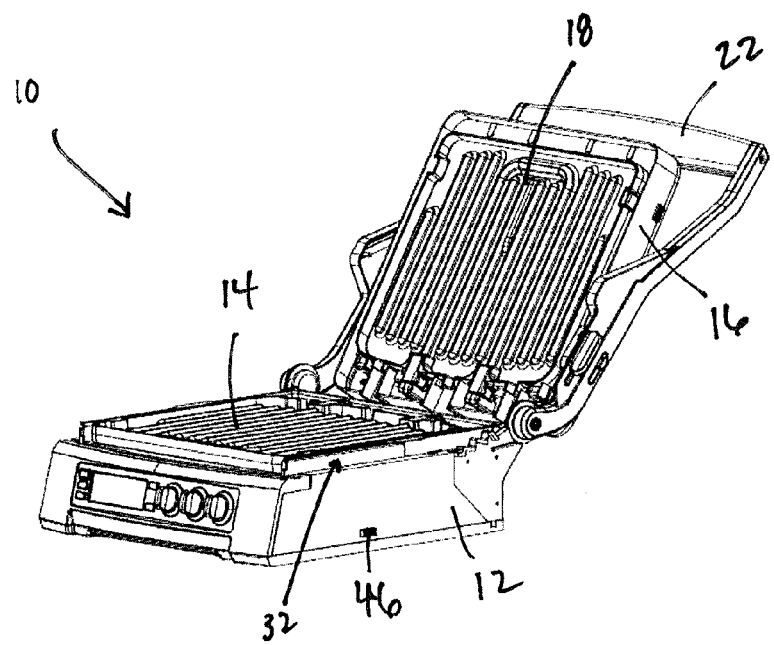
FIG. 14 is a perspective view of the cooking appliance and splash guard of FIG. 12, illustrating the splash guard in a retracted position.
Figure 15:
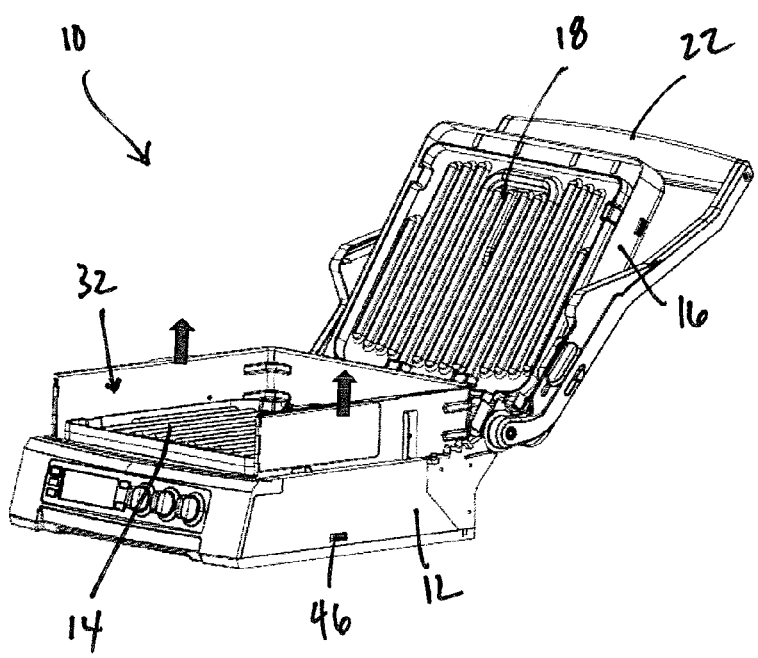
FIG. 15 is a perspective view of the cooking appliance and splash guard of FIG. 12, illustrating the splash guard in an extended position.

With reference to FIGS. 14 and 15, the splash guard 32 is nestable within the lower housing 12 and is selectively extendable therefrom. In particular, the splash guard 32 is movable from a nested position, in which the splash guard 32 is substantially received within the lower housing, as shown in FIG. 14, to an extended position, in which the splash guard 32 is extended from the lower housing 12 and surrounds the lower heating plate 14, as shown in FIG. 15. In the preferred embodiment, the splash guard may be extended from the lower housing 12 by simply lifting up on the splash guard 32. Importantly, selective extension of the splash guard 32 from the lower housing (as well as retraction of the splash guard 32 into the lower housing 32) is facilitated by the sliding engagement of guides 40 within guide slots 42. While FIGS. 14 and 15 illustrate the cooking appliance 10 with the splash guard 32, splash guard 50 is extendable from housing in a similar manner when used therewith.

Figure 16:
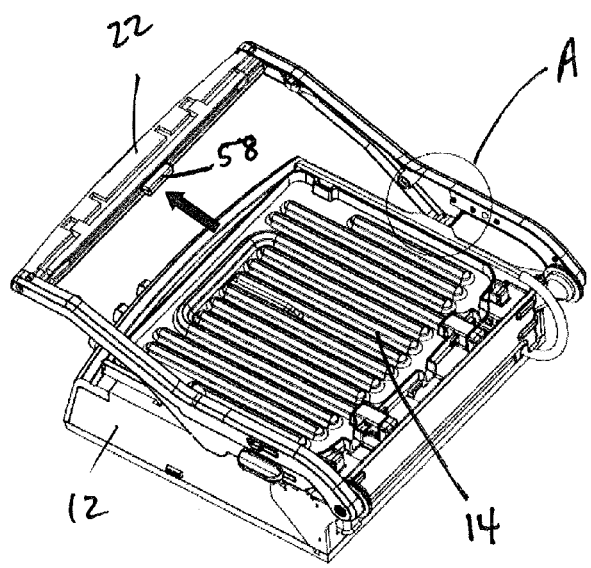
FIG. 16 is a perspective view of the lower housing and handle of the cooking appliance of FIG. 12.
Figure 17:
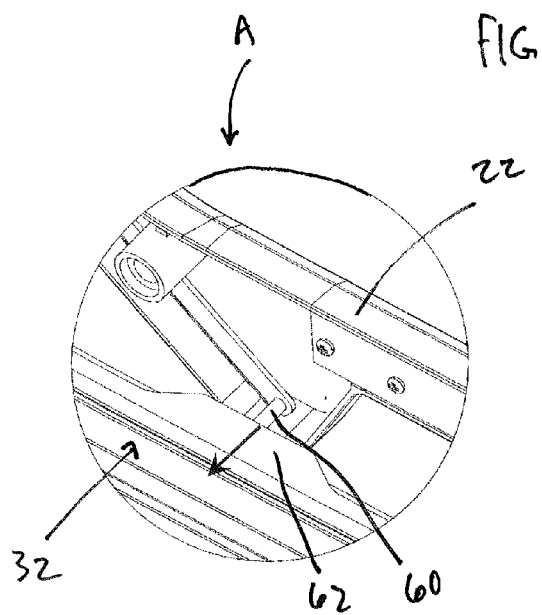
FIG. 17 is an enlarged, detail view of area A of FIG. 16.
Figure 18:
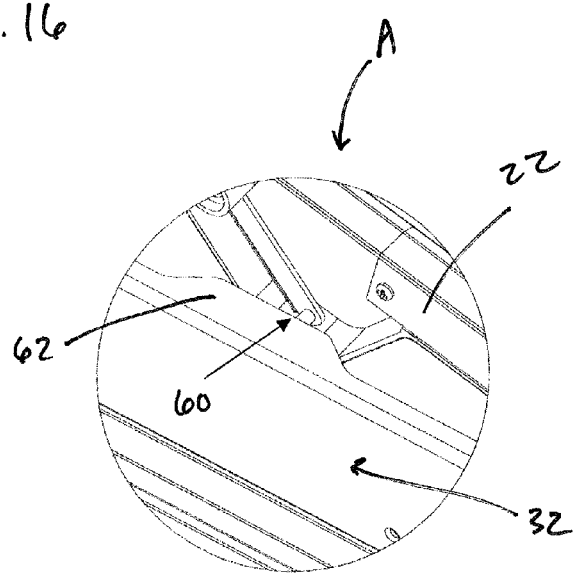
FIG. 18 is another enlarged, detail view of area A of FIG. 16.
Figure 19:
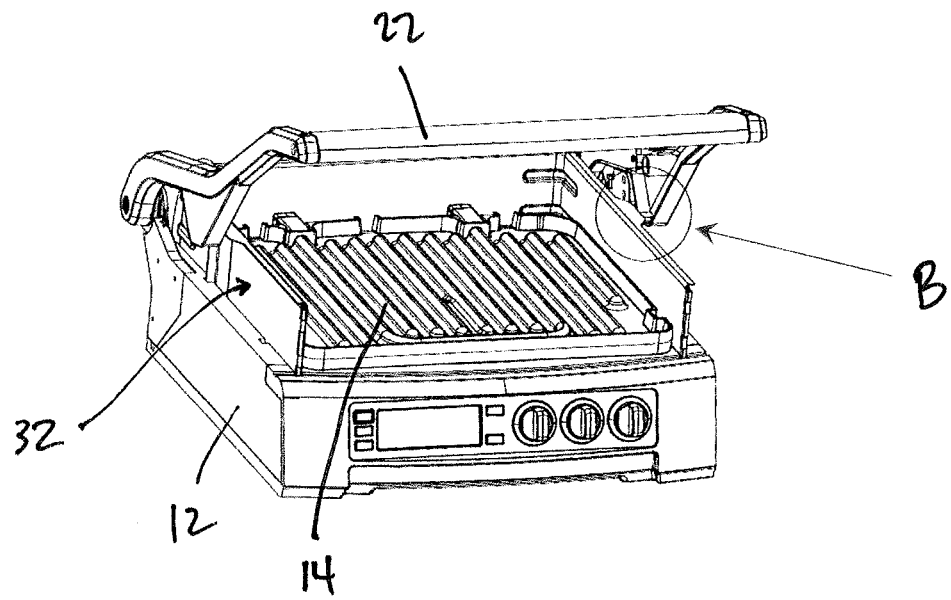
FIG. 19 is a perspective view of the housing of the cooking appliance of FIG. 12, illustrating extension of the splash guard.
Figure 20:
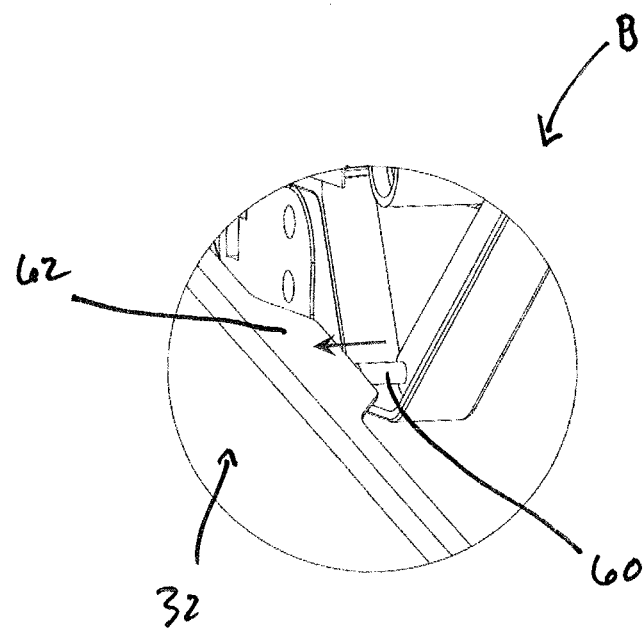
FIG. 20 is an enlarged, detail view of area B of FIG. 19.

FIGS. 16-22 illustrate an alternative mechanism for selectively raising and lowering the splash guard 32 (or splash guard 50) with respect to the lower housing 12 of the cooking appliance 10. As best shown in FIGS. 16-18, the splash guard 32 may be extended from the lower housing 12 by lifting up on the handle 22. In particular, the handle 22 may include a button 58 that, when depressed, causes pins 60 to extend transversely from the legs of the handle 22 beneath a tab 62 formed on the sidewalls 36 of the splash guard 32. Once the pins 60 engaged with an underside of the tab 62, lifting of the handle 22 pulls the splash guard 32 from its nested position within the lower housing 12 to its extended position.

With further reference to FIGS. 19-22, in operation, depressing the button 58 causes a first lever 64 operatively connected to the handle 22 to contact a second lever 66, thereby causing the second lever 66 to rotate in the direction of arrow A. The pin 60 at the distal end of the second lever 66 is thereby biased to a position in which it is beneath the tab 62 of the splash guard 32. In this position, lifting up on the handle 22 causes the pins 62 to pull up on tabs 62, thereby lifting the splash guard 32 from the housing 12 to a position where protrusions interior to the housing 12 engage the slots 44 in the splash guard 32 to retain the splash guard 32 in an elevated, extended position. As discussed above, retraction of the splash guard 32 is effected by actuating release button 46.

It is an important aspect of the present invention, therefore, that the splash guard 32 may be selectively extended from the lower housing 12 of the cooking appliance 12 to substantially surround a food item 34 positioned on the lower heating surface. In this position, the splash guard 32 contains splatter and prevents such splatter from existing the appliance 10 and making a mess on countertops or other surrounding surfaces. In addition, the splashguard 32, in combination with the upper and lower heating plates 18, 14, adds baking capabilities to the cooking appliance 10, as discussed above. As will be readily appreciated, the splash guard 32 therefore provides a degree of cleanliness and functionality heretofore unknown in the art.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A cooking appliance, comprising:
   an upper housing having a first heating surface;
   a lower housing operatively connected to said upper housing, said lower housing having a second heating surface; and
   a splash guard having a plurality of peripheral sidewalls, said splash guard being selectively retractable into said lower housing and extendable therefrom to a position wherein said splash guard substantially surrounds said second heating surface.

2. The cooking appliance of claim 1, wherein:
   said splash guard is substantially rectangular in shape.

3. The cooking appliance of claim 1, wherein:
   said splash guard includes a pair of doors hingedly coupled to opposing sidewalls of said splash guard.

4. The cooking appliance of claim 1, wherein:
   said sidewalls are approximately 2 inches in height.

5. The cooking appliance of claim 1, wherein:
   said splash guard is movable between a retracted position, in which said splash guard is substantially nested within said lower housing, and an extended position, in which said splash guard is substantially extended from said lower housing.

6. The cooking appliance of claim 5, further comprising:
   a means for retaining said splash guard in said extended position.

7. The cooking appliance of claim 5, wherein:
   said first heating surface is selectively positionable atop said splash guard in said extended position to substantially enclosure said splash guard.

8. The cooking appliance of claim 1, wherein:
   said splash guard is selectively removable from said cooking appliance.

9. The cooking appliance of claim 5, further comprising:
   a handle connected to said upper housing, said handle being operable to selectively move said upper housing in relation to said lower housing; and
   wherein said handle is operable to selectively move said splash guard from said retracted position to said extended position.

10. The cooking appliance of clam 9, wherein:
    said handle includes a button and an extendable pin;
    wherein depression of said button causes said pin to extend toward said splash guard and engage a tab of said splash guard such that upwards movement of said handle causes said pin to exert an upwards force on said splash guard.

11. A splash guard for a cooking appliance having an upper housing having an upper heating surface operatively connected to a lower housing having a lower heating surface, said splash guard comprising:
    a plurality of peripheral sidewalls forming a cavity therebetween;
    wherein said splash guard is retractably received in slots formed in said lower housing and substantially surrounds said lower heating surface; and
    wherein said splash guard is configured to be received adjacent said lower heating surface, such that said splash guard is selectively captured between said upper heating surface and said lower heating surface.

12. The splash guard of claim 11, wherein:
    said splash guard is nestable within said lower housing and extendable therefrom to said position wherein said splash guard substantially surrounds said lower heating surface.

13. The splash guard of claim 11, wherein:
    said splash guard is substantially rectangular in shape.

14. The splash guard of claim 11, wherein:
    said splash guard includes a door hingedly coupled to a sidewall of said splash guard, said door being selectively openable and providing a means of ingress to said cavity at a front of said cooking appliance.

15. The splash guard of claim 11, wherein:
    said sidewalls are approximately 2 inches in height.

16. The splash guard of claim 11, wherein:
    said splash guard is movable between a retracted position, in which said splash guard is substantially nested within said lower housing, and an extended position, in which said splash guard is substantially extended from said lower housing.

17. The splash guard of claim 11, wherein:
    said splash guard is selectively removable from said cooking appliance.

18. The splash guard of claim 16, wherein:
    said cooking appliance includes a handle connected to said upper housing; and
    wherein said handle is operable to selectively move said splash guard from said retracted position to said extended position.

* * * * *